Jan. 11, 1966     O. G. GARNER     3,229,012
METHOD AND APPARATUS FOR EXTRUDING LAMINAR WALL
Filed May 28, 1962     2 Sheets-Sheet 1
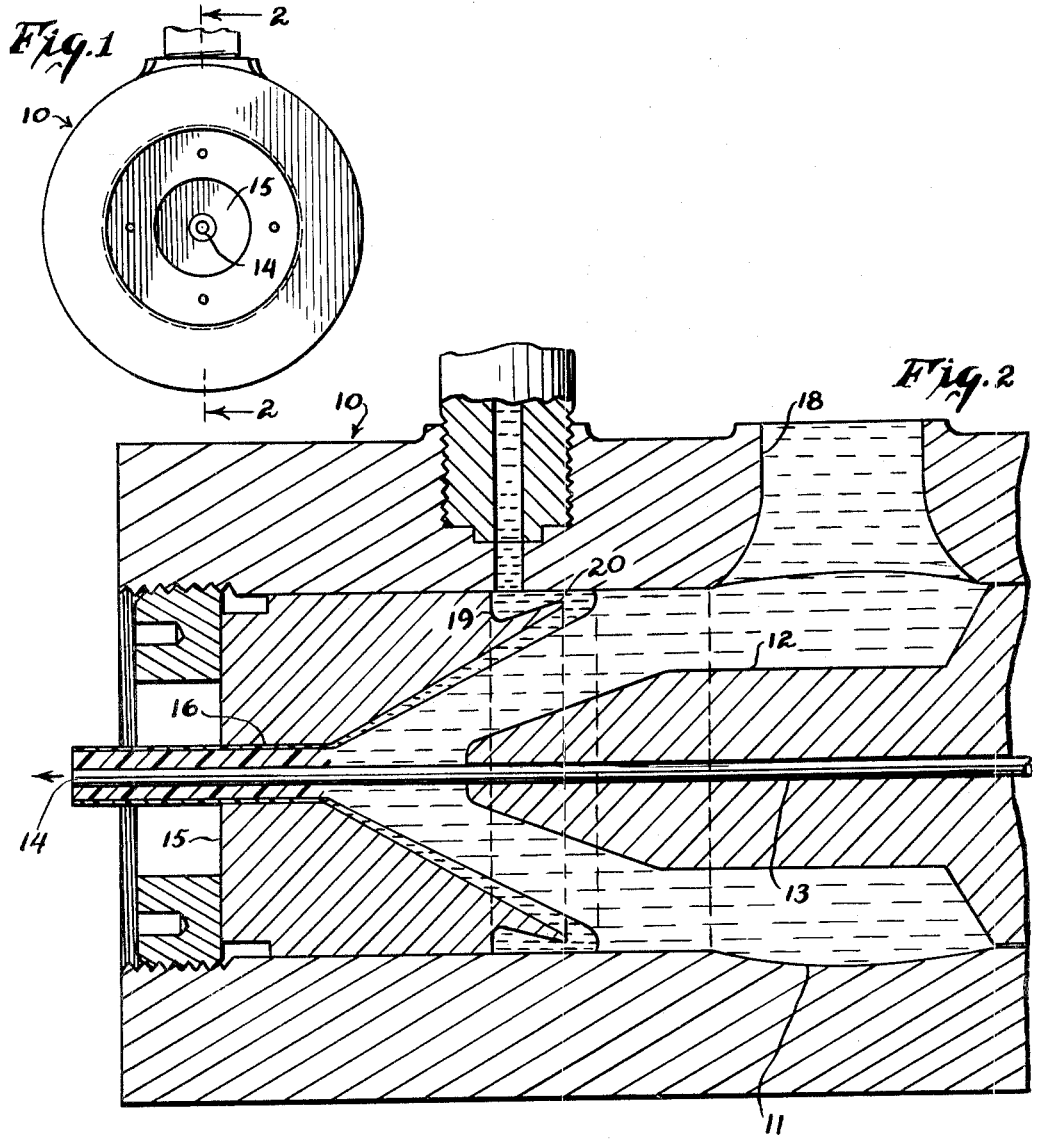
INVENTOR.
OSCAR G. GARNER
BY
Emery, Whittemore, Sandoe & Graham
ATTORNEYS Jan. 11, 1966          O. G. GARNER          3,229,012

METHOD AND APPARATUS FOR EXTRUDING LAMINAR WALL

Filed May 28, 1962          2 Sheets-Sheet 2

INVENTOR.
OSCAR G. GARNER

BY

Emery, Whittemore, Sandoe & Graham

ATTORNEYS

3,229,012
METHOD AND APPARATUS FOR EXTRUDING LAMINAR WALL

Oscar G. Garner, Westfield, N.J., assignor to General Cable Corporation, New York, N.Y., a corporation of New Jersey
Filed May 28, 1962, Ser. No. 198,153
12 Claims. (Cl. 264—174)

This invention relates to method and apparatus for continuously extruding in a single operation a laminar wall of plastic compounds, one lamina of which is a very thin layer, onto a moving core of indefinite length, and to the product of such method and apparatus. The invention is peculiarly adapted to the application of a plastic wall of the character described onto a core comprising an electrical conductor, or onto an electrical conductor core comprising one or more conductors which may be individually insulated and arranged as desired. The invention will be described here, for purposes of illustration, with particular reference to electrical conductors. This invention is useful in extruding various plastic compounds, both thermoplastic and thermosetting. These plastic compounds ordinarily are electrical insulating compounds, but the compound for the thin lamina preferably will be made conductive by the addition thereto of finely divided conducting material such as carbon. For purposes of illustration the invention will be described with reference more particularly to the extrusion of thermoplastic material such as polyethylene compounds, one of which is electrically conductive. The scope of the invention will be determined by the claims.

In the manufacture of conductors insulated with plastic material it is the usual practice to form the wall of insulating material by extrusion. The plastic insulating wall is formed by passing the conductor through an extrusion tip and the die member of an extruding apparatus, the wall of insulating material being extruded under pressure onto the moving conductor or conductor core, as it passes through the die. By selection of suitable extruding pressure, temperature, and speed for the particular insulating material being applied to the core, it is possible to extrude an insulating wall of substantial thickness which is concentrically arranged on the core and which is of substantially uniform thickness.

However, this extrusion method of applying walls on conductor cores cannot be employed successfully for applying very thin layers of insulation, that is layers or skins which are of the order of a mil, or even a few mils, in thickness. When attempts are made to extrude such very thin walls of plastic material the experience has been that the walls cannot be depended on to be continuous, or to be of uniform thickness circumferentially of the core onto which they are extruded. Moreover, with extruded very thin walls of insulating material, even if extruded onto thicker walls of the same or similar insulating material, there is a lack of bond between the layers, and the thin outer wall will be subject to peeling and to skinning back on the underlying insulation if the insulated core is drawn into a duct, or over a sharp edge.

One application where it would be useful to apply a thin layer of insulating base conducting material over a wall of insulation is the construction where a conductor having an enclosing wall of insulating material is to have, either on the inner or the outer surface of the insulating wall, or both, a thin layer of conducting material to function as an electrical shield. Heretofore, various constructions have been proposed for the shielding layer in such conductor constructions. Helical or longitudinal wraps of metal foil, metallized paper, paper containing conducting material, cotton tapes impregnated with conducting material, and the like have been applied to the insulated conductors to constitute the electrical shield. It has been proposed also to form the shielding layer by applying coatings of conducting paint, lacquer, and the like, by dip process, or by wiping. The known constructions are all costly to manufacture and many which have been proposed have limited practicability, for a variety of reasons.

Consideration has heretofore been given to the possibility of extruding a shielding layer composed of the same material as the insulating wall, but to which has been added carbon or other conducting material for the purpose of making the insulating base material an electrical conductor. The impracticability, or impossibility, of extruding very thin layers of the insulating material is further increased by the inclusion of the conducting material in the insulating compound. For example, to make polyethylene sufficiently electrically conductive to function efficiently as a shielding material in very thin layers might require inclusion of more than 30 percent by weight of carbon or similar conducting material. The loading of polyethylene with such an amount of carbon, for example, would greatly change the physical characteristics of the polyethylene compound so that it would tend to crumble and to have very little tensile strength, especially in very thin layers. Moreover, a wall of such conducting polyethylene extruded on an insulating wall, also of polyethylene, in separate or sequential steps would not bond firmly to the insulation, would have gas pockets formed at the interface, and would peel easily. This has been demonstrated by past trials and experiments.

The literature discloses the extrusion of two plastic insulating materials onto a wire by what has been termed simultaneous extrusion. In these wire constructions the inner extruded layer serves primarily as insulation and the outer extruded layer functions primarily as a protective jacket. In these known simultaneous extrusion operations the mass or volume of the two plastic materials has been approximately the same, so that while the outer plastic layer may be thinner than the inner layer, due to the differences in mean diameters of the layers, the outer layer never has been a thin skin approaching one mil and less in thinness.

Moreover, it is believed that in these known simultaneous extrusion arrangements there have actually been two separate dies, although both dies may have been mounted within a single extruding head. The thickness and surface of the inner wall of insulating material were determined by the first die, and the jacketing material then was extruded on over the formed wall of insulation, the wall of the jacketing material being formed by the second die. In effect, this was a sequential extrusion operation performed by two extruding dies mounted in a single head.

According to the present invention a very thin layer, or skin, of conducting polyethylene, for example, can be extruded onto either surface of an insulating wall of polyethylene with a firm bond between the two walls which prevents any peeling or stripping of the conducting layer from the insulating layer. By the method of the present invention it is possible to extrude walls of conducting polyethylene which are of the order of a mil or several mils in thickness. According to this invention the conducting layer is a thin film or skin which is intimately bonded to the insulating layer, the two layers having been extruded simultaneously through a single extrusion die.

It is an object of the present invention to provide a new and improved method of continuously extruding a laminar covering on an electrical conductor or other core of indefinite length. It also is an object of this invention to provide a method of extruding a thin film or skin of electrically conducting compound which is intimately bonded to a coextensive wall of insulating material. Still another object of this invention is to provide a method of simultaneously extruding intimately bonded layers of plastic material onto an electrical conductor or other core. Another object of the invention is to provide new and improved apparatus for performing these new methods. It also is an object of this invention to provide improved electrical conductors of indefinite length in which a thin skin or film of plastic material, conducting or insulating, is intimately bonded to a coextensive thicker wall of plastic insulating material.

The above mentioned advantages and objects of the invention will be better understood, and other objects and advantages will become apparent from the following detailed description of the illustrative embodiments disclosed in the accompanying drawings, wherein:

FIGURE 1 is an end elevation of an extruder head for applying a laminar wall of plastic compounds onto a core;

FIGURE 2 is a longitudinal section, to larger scale, through the extruding apparatus on the line 2—2 of FIGURE 1, showing an arrangement in which the outer layer is a thin skin;

FIGURE 3 is an elevation, to still large scale, of a core onto which a laminar wall has been extruded by apparatus such as is disclosed in the FIGURES 1 and 2, the core coverings being progressively cut back to disclose the construction more fully;

FIGURE 4 is a section through the core of FIGURE 3, taken substantially on the line 4—4;

Figure 5:
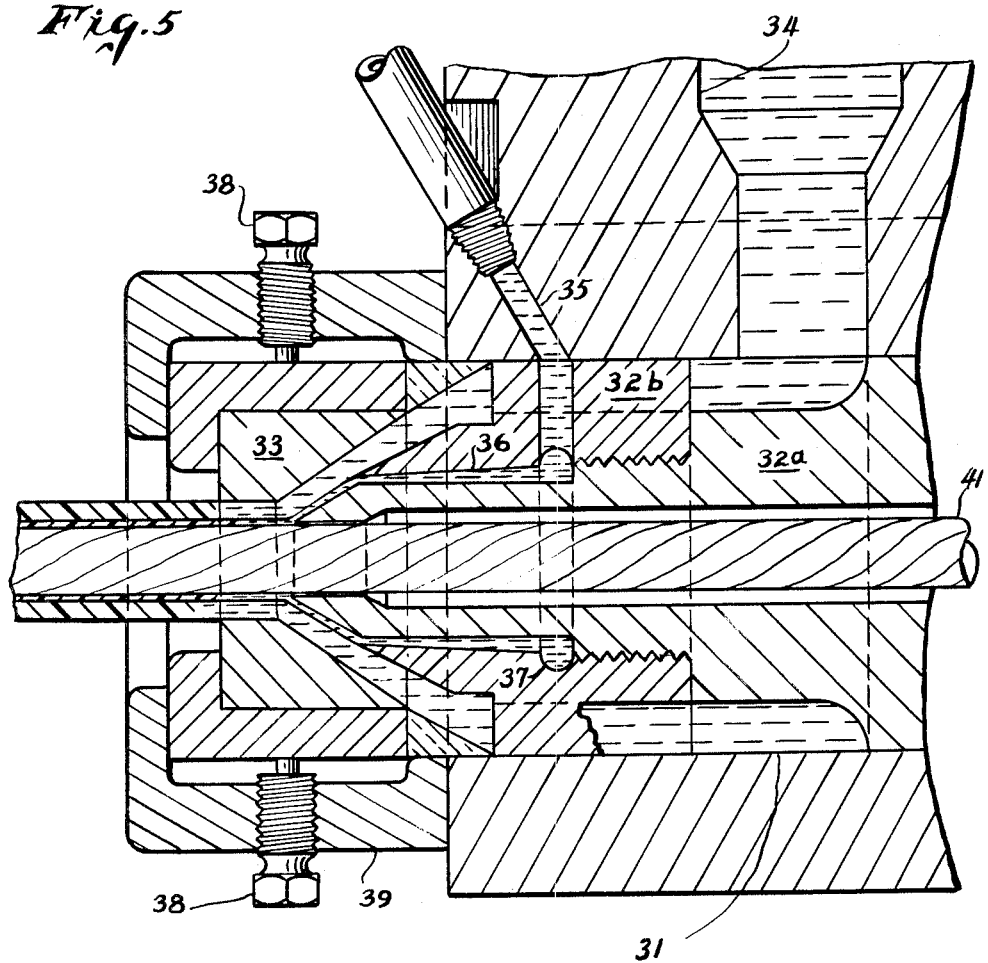
FIGURE 5 shows extruding apparatus for applying a laminar wall of plastic compounds onto a core in which the inner layer is a thin skin.

In the application drawings it is not practicable to show the very thin skin layer to scale, or even in correct proportion to the thicker insulating wall, and for purposes of better visual illustration the thin skin layer is shown exaggerated in thickness.

Referring first to FIGURES 1 and 2, 10 represents an extruding head made according to the present invention for continuously extruding a laminar wall of plastic compounds in distinct, interbonded layers onto a moving core of indefinite length. An extrusion tip 12 is supported in a conventional extruding machine die body chamber designated generally as 11. The extrusion tip is provided with a longitudinal aperture 13 through which the core 14 moves, from right to left as shown in FIGURE 2. Supported in the die body chamber 11, spaced beyond the extrusion tip 12, is an extrusion die 15, the throat 16 of which fixes the final overall diameter of the extruded laminar core.

Entry of plastic insulating material for covering an electrical conductor core to the die body chamber 11 will be made through opening 18, the plastic material conveniently being forced into the die body chamber 11 by the usual screw feeding means, not shown. Passage of the plastic insulating material through the relatively constricted passageway between the nozzle end of the extrusion tip 12 and the throat 16 of the die 15 forces the plastic material to flow and form a compact wall around the core 14.

The plastic conducting compound which is to form the thin skin on the outer surface of the thicker plastic insulating wall is bled to the interface between the plastic insulating compound and the funnel-shaped, wall-forming surface of the die 15, around the entire periphery of the wall-forming surface, preferably adjacent the entrance of the insulating compound to the die. References herein to bleeding a second plastic material into the interface between the main body of plastic material being extruded on the moving core and a wall-forming surface of the die are to be construed as meaning continuously exuding under pressure a comparatively small metered amount of the second plastic material into the interface between the main body of plastic material and the die tip or the surrounding die in a layer which extends around the entire periphery of the wall-forming surface and which has the desired thickness. As shown, a peripheral channel 19 is formed in the outer surface of the die 15 between the leading edge of the die and the wall of the die body chamber 11 and is supplied with plastic material under pressure. This channel 19 is undercut in the manner shown to provide a relatively low resistance to the flow of compound around the die. By such a construction it is possible to maintain a substantially uniform pressure on the compound around the die and thus insure bleeding of a circumferentially uniform film of conducting compound over the leading edge 20 of the die to the interface between the plastic insulating compound and the funnel-shaped, wall-forming surface of the die.

By controlling the pressure of the plastic material within the peripheral channel 19 the amount of plastic material which bleeds over the edge of the die to the interface between the wall-forming surface of the die and the thicker body of plastic compound can be closely controlled. Conducting plastic material is supplied to the channel 19 through the wall of the die body chamber 11, under pressure, by conventional screw or equivalent means, not shown.

The space (shown exaggerated in the drawing) between the leading edge 20 of the die 15 and the wall of the die body chamber 11 is narrow and controls the thickness of the plastic compound bled from the channel 19 to the interface between the insulating body and the wall-forming surface of the extrusion die. By selection of a suitable spacing, and of suitable pressures on the plastic materials it is possible to form on the outer surface of the underlying plastic insulating body a thin skin of desired thickness which in the final product may be a mil, or less, or a few mils in thickness. This thin skin of plastic material so formed is intimately and uniformly bonded to the underlying plastic wall through fusion of the two plastic materials resulting from exposure to the pressure and temperature within the extruding head. The layer of plastic material being bled to the outer surface of the thicker plastic insulating body in limited amount spreads uniformly and acts somewhat as a lubricant might be expected to act between the funnel-shaped, wall-forming surface of the extrusion die 15 and the outer surface of the plastic insulating body moving therethrough.

FIGURES 3 and 4 show by way of illustration an insulated and shielded electrical conductor made according to the present invention. The conductor 24, which if desired might be a conductor core comprising a plurality of individually insulated and suitably arranged conductors, has a wall 25 of plastic insulating material and an outer thin skin 26 of plastic conducting material forming a shield over the insulation. The overall diameter of the plastic covered core was determined by the throat of the die 15, and the shielding layer 26 was formed by bleeding conducting plastic from the passageway 19. For example, the insulating material 25 might be polyethylene and the shield 26 might be formed from a conducting polyethylene base material.

As an example of a suitable conducting plastic for an electrical shield of the order of one mil or thereabouts in thickness this plastic might comprise 60 parts of carbon, 50 parts of polyethylene, and 50 parts of butyl rubber, all proportions being by weight. Such a conducting compound would, by reason of inclusion of the large proportion of carbon, have little tensile strength and be incapable of being separately extruded in a thin continuous layer.

If an attempt was made to extrude this conducting material separately over a previously formed insulating wall the extruded conducting layer would be discontinuous and non-uniform, and it would peel and separate readily from the underlying insulation. Because of the intimate interbonding of the conducting plastic material to the insulating layer, when applied simultaneously therewith according to the present invention, the mechanical weakness of the shielding layer by itself is acceptable. By reason of the firm bonding of the shielding layer to the insulating layer the shielding layer is reinforced and supported by the insulating layer and effective continuity and uniformity of the shielding layer are assured.

FIGURE 5 shows an extruding apparatus for applying a thin skin of plastic conducting material under a thicker wall of plastic material by a single step extrusion. The die body chamber 31 corresponds to the die body chamber 11 in FIGURE 2, and the two part extrusion tip 32a, 32b supported in the die body chamber 31 serves to guide the core 41 into the extrusion die 33. As shown, the core 41 moves from right to left. Plastic insulating compound is fed into the die body chamber 31 through opening 34, conveniently by the usual screw feeding means, not shown. Passage of the plastic insulating material through the relatively constricted passageway between the nozzle end of the extrusion tip and the throat of the die 33 forces the plastic material to flow and form a compact wall around the core 41.

Plastic conducting compound is fed through opening 35 into a coaxial channel 36 between the parts 32a and 32b of the extrusion tip, conveniently by known screw feeding means, not shown. In the illustrative embodiment the inner surface of parts 32b is provided with an enlarged circumferential channel 37 which exerts relatively low resistance to flow of the conducting compound around the extrusion tip. This will insure supply of conducting compound to the coaxial channel 36 under uniform pressure at all points around the channel.

The die 35 may be adjusted laterally by the screws 38 in the wall of the die holder 39, secured on the extruding head in conventional manner.

The plastic conducting compound is fed forward in the channel 36 under pressure and is bled out through the narrow opening (shown exaggerated in the drawing) between the parts 32a and 32b of the extrusion tip to the interface between the body of insulating compound moving through the extruding head and the wall-forming surface of the extrusion tip. The conducting compound is intimately and uniformly bonded to the overlying body of insulating material as the materials progress through the extruding head. As in the case of the embodiment of FIGURE 2, the conducting material is supplied in limited amount and spreads uniformly over the inner surface of the body of insulating material, acting somewhat as a lubricant might be expected to act.

By selection of a suitable bleeding gap between the parts 32a and 32b, and suitable pressures, it is possible to form on the inner surface of the insulating wall of the finished product a thin conducting skin which may be a mil, or less, in thinness. This thin skin which has been formed by being bled into the interface during the extruding operation is a uniform thin skin which is intimately bonded by fusion to the underlying plastic material by the pressure and temperature conditions existing in the extruding head.

Figure 6:
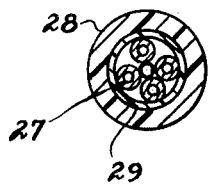
FIGURE 6 is a section through another electrical conductor construction in which a plurality of individually insulated conductors are enclosed within a laminar wall extruded by apparatus as disclosed in FIGURE 5.

FIGURE 6 shows merely by way of illustration a conductor core comprising a plurality of individually insulated conductors 27, which may be twisted in pairs if desired. In this example the insulating wall 28 has a thin skin 29 of conducting plastic on its inner surface.

The application of a skin-thick conducting layer on one surface of conductor insulation has utility both for communication cables and for power cables. For communication cables the diameter of the skin conducting layer might be as small as 30 mils, or less, whereas for power cables the diameter might be up to 2 or 3 inches. For electrical purposes, a one mil thick conducting film is all that might be needed, in particular for communication cables, but a one mil thick conducting skin on larger cables would be inadequate for mechanical reasons. In certain constructions a one mil thick conducting skin might be inadequate on smaller cables also, for example on cables of the order of ¼ inch diameter where the conducting skin will be in physical contact with an overlying metal wire braid. In such constructions the wire braid would press against and tend to cut into the skin, and a conducting skin thickness of several mils usually would be preferred to a skin thickness of one mil. Present indications are that in these constructions a skin thickness of two or three mils would be adequate in most instances, with a maximum thickness of above five mils, except for larger power cables, where the upper limit of skin thickness would be about ten mils.

While subject to modification to meet special conditions and situations, present experience indicates that a general relation between the thickness of the conducting skin and the diameter thereof can also be expressed in percentages. For cables up to ¼ inch diameter the upper limit of the thickness of the conducting skin would be about 2 percent of the diameter. For cable diameters of ¼ inch to ½ inch the maximum conducting skin thickness would be about 1½ percent of the diameter. And for diameters above ½ inch the conducting skin thickness limit would be about 1 percent of the diameter.

The thin skin, whether applied on the inner or the outer surface of the relatively thick insulating wall, or on both surfaces, forms a distinct layer. That is apparent from examination of a cross section through a laminar wall formed according to the present invention. Although the layers are fused togther, the material of the conducting skin is not dispersed into the body of the insulation.

From the foregoing description it will be seen that this invention provides method and apparatus for simultaneously, continuously extruding a laminar wall of plastic compounds onto a moving core of indefinite length, and that this method and apparatus permit extrusion of a very thin skin of plastic compound which is intimately bonded to, and reinforced and supported by, a laminae of greater thickness and tensile strength. The thin skin or film of plastic material, of insufficient strength to be extruded separately, is a distinct layer firmly and uniformly bonded to the surface of the thicker layer by fusion throughout the area of contact, so that it cannot be removed by peeling. The product of the method and apparatus also is new and useful.

While this invention has been described and illustrated hereinabove with special reference to preferred emobdiments thereof, it is to be understood that changes and modifications may be made therein without departing from the spirit or scope thereof as defined by the appended claims.

What is claimed is:

1. The method of continuously extruding a laminar wall of plastic compounds in distinct, interbonded layers onto a moving core of indefinite length, and in which one lamina is much thinner than the adjacent lamina, which method comprises moving the core longitudinally through a die tip, forming a wall of plastic compound around the moving core by forcing plastic compound under pressure through the annular, conically-tapered passageway between the die tip and a die surrounding the said tip, forming a thin, intimately bonded skin of another plastic compound on the said wall as the wall is being formed in the annular, conically-tapered passageway before it reaches the moving core by bleeding the second compound under pressure into the interface between the first plastic compound and a wall-forming surface of the passageway before the wall engages the moving core, and controlling the amount of the second compound bled into the interface to produce in the completed product a skin of the desired thickness.

2. The method set forth in claim 1, in which the second plastic compound is bled into the interface around the entire periphery of the wall-forming surface.

3. The method set forth in claim 2, in which the second plastic compound is bled into the interface adjacent the entrance to the die.

4. The method set forth in claim 2, in which the second plastic compound is bled into the interface at the outer surface of the aforesaid wall.

5. The method set forth in caim 2, in which the second plastic compound is bled into the interface at the inner surface of the aforesaid wall.

6. The method of forming a skin of plastic compound of the order of a mil to five mils in thinness on the surface of a thicker layer of another plastic compound being extruded onto a moving core, which method comprises continuously die extruding the said thicker layer onto the core, simultaneously continuously bleeding the plastic compound for the skin under pressure to the interface between the compound for the thicker layer and the wall-forming surface of the die within the die before the layer actually is compressed onto the moving core, and controlling the amount of the said other compound to produce a skin of the desired thickness.

7. The method set forth in claim 6, in which the plastic compound for the skin is bled into the interface around the entire periphery of the wall-forming surface of the die.

8. The method set forth in claim 7, in which the plastic compound for the skin is bled into the interface adjacent the place of entry into the die of the plastic compound forming the thicker layer.

9. Apparatus for continuously extruding a wall of plastic compound onto a moving core of indefinite length and for simultaneously forming a continuous thin skin of another plastic compound intimately bonded to a surface of the aforesaid wall comprising, in combination, an extruding machine having a die body chamber, a die having an annular, conically-tapered passageway mounted in the wall of the extruding machine, said die having an orifice for discharging the core and its extruded covering, an extrusion tip within the extruding machine for guiding the moving core accurately into the die, means for feeding plastic compound under pressure into the die body chamber through the annular, conically-tapered passageway and out of the die body orifice with the moving core, means for bleeding a relatively small amount of a second plastic compound under pressure into the interface between the first plastic compound and a wall-forming surface of the extruding machine within the annular, conically-tapered passageway before the compound reaches the die orifice.

10. Apparatus according to claim 9, in which the means for bleeding the second plastic compound into the interface includes a channel communicating with the wall-forming surface of the die around the periphery of the die.

11. Apparatus according to claim 10, in which the die is provided with a peripheral channel adjacent the die entrance for bleeding the second plastic compound into the interface.

12. Apparatus according to claim 10, in which the channel for bleeding the second plastic compound to the interface tapers downwardly to the region of communication with the wall-forming surface of the die.

References Cited by the Examiner

UNITED STATES PATENTS

| | | |
|---|---|---|
| 1,802,605 | 4/1931 | Kemp. |
| 2,341,731 | 2/1944 | MacGregor et al. |
| 2,635,975 | 4/1953 | Peters. |
| 2,830,919 | 4/1958 | Schatzel _____ 174—110.44 |
| 2,963,749 | 12/1960 | Pavlic _____ 18—59 |
| 3,047,448 | 7/1962 | Feller et al. _____ 156—56 |
| 3,184,358 | 5/1965 | Utz _____ 18—14 X |

FOREIGN PATENTS

| | | |
|---|---|---|
| 508,338 | 12/1954 | Canada. |
| 861,839 | 3/1961 | Great Britain. |

EARL M. BERGERT, *Primary Examiner.*

J. F. MATHEWS, P. R. WYLIE, *Assistant Examiners.*